United States Patent [19]
Gilman

[11] 3,743,415
[45] July 3, 1973

[54] PHOTOMECHANICAL METHOD

[75] Inventor: Clarence R. Gilman, Vienna, Va.

[73] Assignee: The United States of America as represented by the Secretary of the Interior, Washington. D.C.

[22] Filed: Jan. 21, 1972

[21] Appl. No.: 219,742

[52] U.S. Cl. ............... 355/52, 355/84, 355/103, 355/132
[51] Int. Cl. .................................. G03b 27/68
[58] Field of Search ............... 355/40, 43, 50, 51, 355/52, 67, 70, 78, 81, 84, 103

[56] References Cited
UNITED STATES PATENTS
2,988,979  6/1961  Sigler ........................... 355/84 X
3,507,592  4/1970  McLaughlin .................. 355/40 X
3,445,165  5/1969  Dubbs ............................ 355/84
3,449,048  6/1969  Allison .......................... 355/40

Primary Examiner—Samuel S. Matthews
Assistant Examiner—Richard A. Wintercorn
Attorney—Ernest S. Cohen and Gersten Sadowsky

[57] ABSTRACT

Photomechanical apparatus and procedures are applied to obtain controlled manipulations of image representations having particular utility in topographic mapping including slope mapping, relief shading, and symbol discrimination. Negative and positive transparencies are made photographic copy in the apparatus for enabling production of enhanced and reduced versions of representations, respectively. Spaced beams from revolving light sources are directed to pass through such copy so as to expose photographic film materials maintained spaced from the copy. Selective adjustments of light spacing and dispositions, and exposure limits in the apparatus adapt it for use in differing procedures.

7 Claims, 24 Drawing Figures

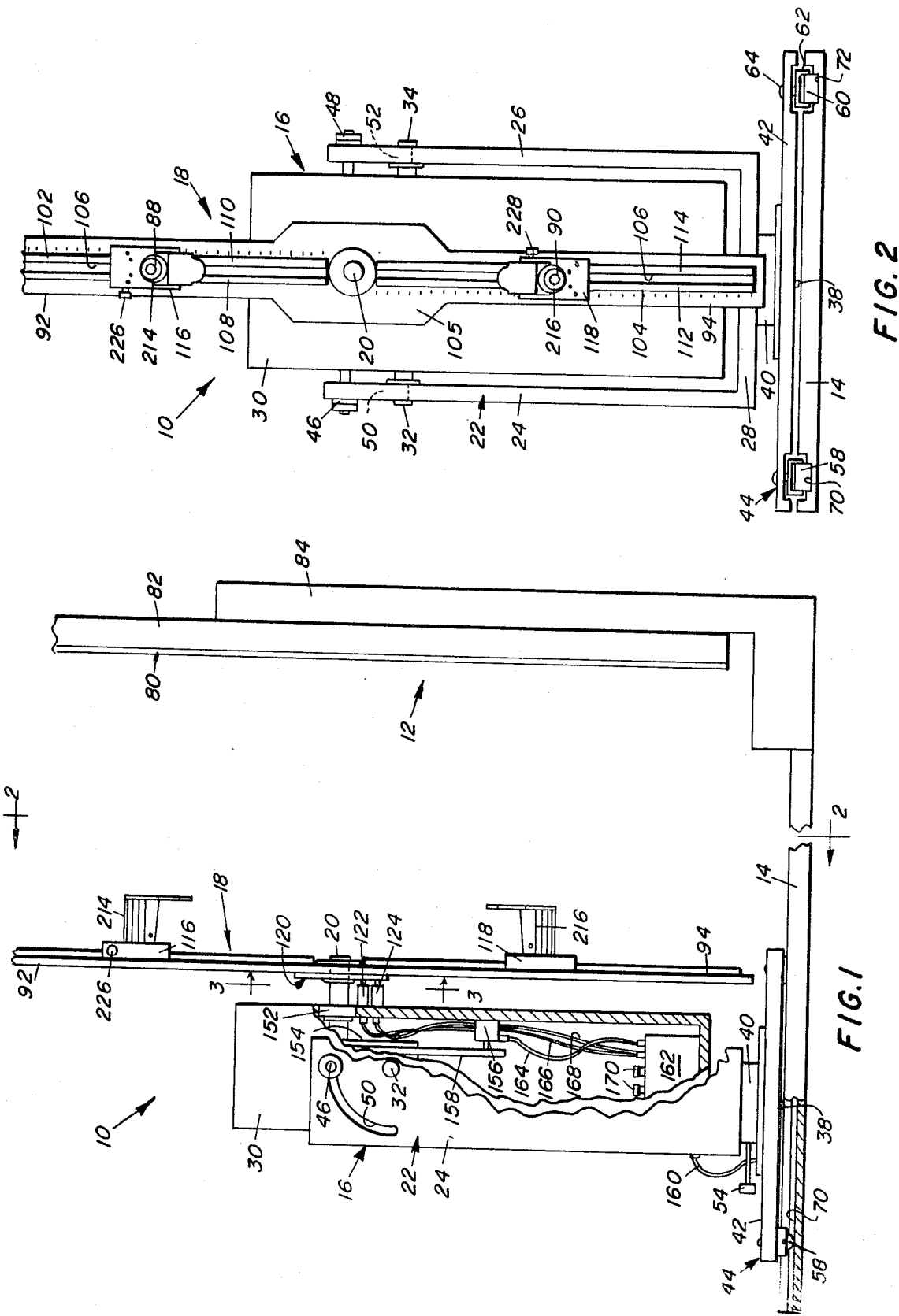

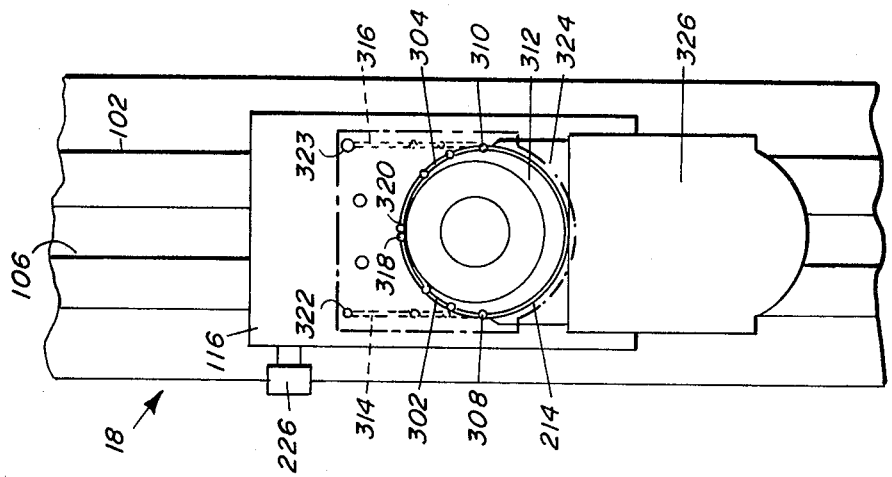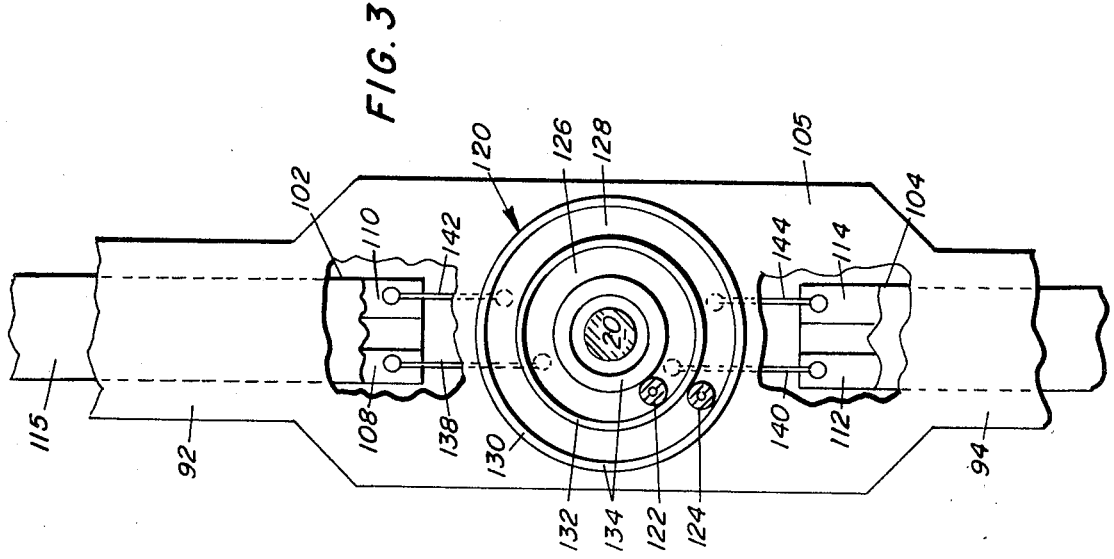

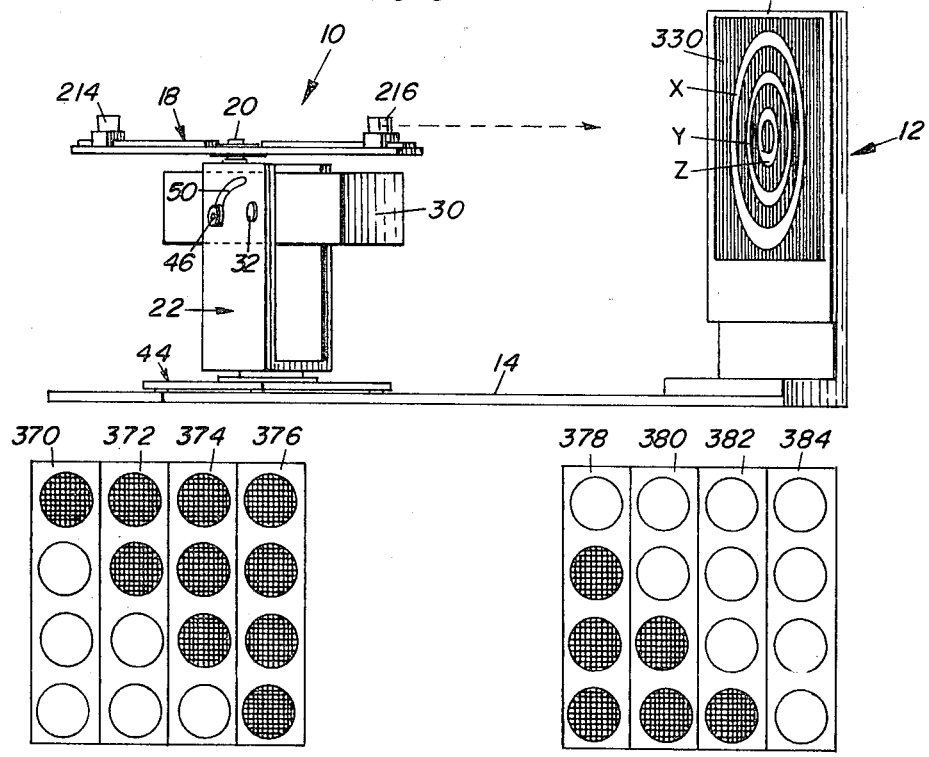
FIG. 6
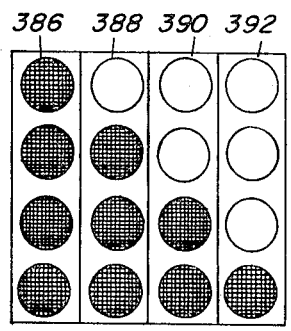
FIG. 9A
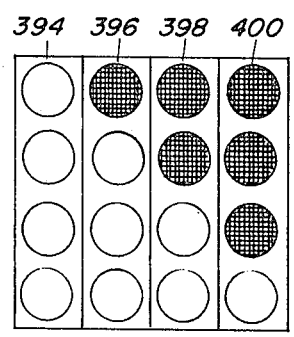
FIG. 9B
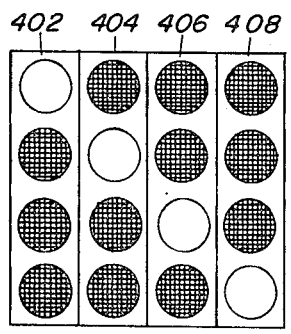
FIG. 9C
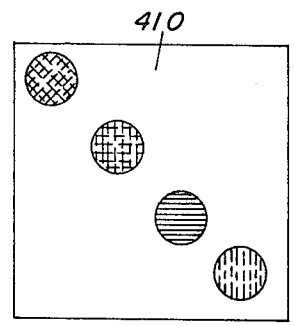
FIG. 9D
FIG. 9E
FIG. 9F

PHOTOMECHANICAL METHOD

Photomechanical apparatus disclosed herein features controls for manipulating the weight and character of lines and other graphic representations in image depiction materials such as photographic transparencies. In response to this control lines and other representational forms can be thinned or thickened, as well as weighted in selected directions. The apparatus is particularly useful in facilitating map symbol discrimination by which such symbols of similar line weight are isolated whereby they are adapted for an automatic scanning procedure which groups and records them in digital format. Digital cartographic information may serve as a principal input to an automated system for map revision. Such data are also applicable in an automated photomechanical generation of a series of slope zones for slope maps, a technique employing the controlled manipulation of line weights to isolate and record mapped areas of similar terrain. Enhanced contour lines for shaded relief renditions can also be produced through the use of the automatic photomechanical generation. The control applied in that instance changes weight of the contours by a manipulation of the weight thereof in only selected directions.

Techniques and equipment for accomplishing line weight manipulation of recorded symbols, similar to that having applicability in the preparations of indicia for automatic processing of mapping data of the kind hereinbefore indicated, have heretofore been described as practiced in the prior art. Fundamental to the various prior art concepts which are encountered is the adaptation to a photographic procedure of an assemblage of light resolving and responsive elements, including a photographic negative, or positive, or both, and a light-sensitive image-producing surface, which are set up in a predetermined spatial relationship with a predetermined dynamic or static disposition imparted thereto. In this connection U.S. Pat. No. 1,725,395, granted Aug. 20, 1929, to A Fruwirth, discloses a unique assembly in which both positive and negative photographic elements of a design are made applicable in a spaced disposition, and a light sensitive surface is placed in contact with the positive. Line weights of the Fruwith design are selectively modified to achieve various artistic effects, including a raised-in-relief appearance, by setting the assemblage at predetermined inclinations with respect to incident parallel rays of light directed thereat, and in one instance additionally rocking the assemblage, or alternatively the light source, about a selected predetermined axis of inclination at uniform speed. A more common technique for thinning, thickening, or otherwise modifying lines of a design, which is disclosed in connection with the teachings in a U.S. Pat. No. 2,286,883, granted June 16, 1962, to M. J. Weber, U.S. Pat. No. 3,204,544, granted Sept. 7, 1965, to J. A. Shannon, and U.S. Pat. No. 3,508,826, granted Aug. 28, 1941, to E. J. Grabau, has as basic thereto the projection of an image of an original copy upon a sensitized sheet and during the course of such projection a series of related and controlled movements are induced between the copy and sheet so that there is exposed on this sheet desired variations of the original characteristics of the copy. In Weber's arrangement a fixed or stationary transparent support plate is disposed to face a transparent support plate adapted to shift in a rotary path, that is to orbit, and photographic elements, including a negative and a positive of an image, and a sensitized sheet, are selectively positioned between the support plates such that one or two of the elements are secured to the movable plate and the remainder is secured to the stationary plate. Light from a singular point source projected at the stationary plate passes through the transparent area of the supports and elements of the indicated assemblage and exposes the sensitized sheet to form a latent image in accordance with the particular order in which the photographic elements are disposed between the support plates. Thickening, thinning, outlining, or shadowing of the image form are thus caused to arise in a resultant product. The Shannon and Grabau patents are distinguishable over the basic considerations of Weber's teaching only to the extent that in these later patents different details of construction appear for the apparatus manipulating line weight. However, in each of these patents light reaching a sensitized surface from a point source of light is directed through a negative shifted in a rotary path along with an orbiting frame on which it is mounted. In a further embodiment disclosed by Grabau, point source light emanating from a stationary negative is caused to follow an image forming pattern when directed to expose a photo-sensitive plate by way of a lens which is adjustable in a housing designed for rotation with respect to the structure fixedly supporting the light source, the negative, and light sensitive plate. Rotation of the housing in a circular or other path causes rotation of the adjusted lens to askew the light passing therethrough so as to define on the light sensitive plate an expanded image in a predetermined pattern. In contradistinction to the aforementioned prior art a relatively simple structural arrangement according to the present invention includes at least one set of predisposed light sources which are revolved to obtain in the operation thereof a considerably increased magnitude of line weight changes which are consistent throughout the area of a relatively large showing. Moreover, such changes are minutely as well as grossly adjustable in a convenient manner.

Manipulation of line weight or line form in a pictorial representation following a practice according to the present invention requires only that movement be imparted to light sources arranged to expose a light sensitive surface. In one example, a requisite light source is manifested at two diametrically spaced points which during the aforesaid practice are propelled in a circular path. The light path made effective in this manner remains virtually continuously directed at a photographic assemblage which is held fixed to a platen at a predetermined distance from the requisite light source. In effect, a transparency of the pictorial representation set up in the assemblage facing the light directed thereat is situated by its disposition to stand between the light and a light sensitive surface of the assemblage, such light sensitive surface being in register with the transparency and uniformly spaced therefrom. An exemplary apparatus for the procedure disclosed herein obtains light from individual lamps which are installed on adjustable devices normally held fixed to a carrier arm having a centrally disposed axial support. A general support structure for the carrier arm, maintaining its axial support for rotation, is arranged so as to face the arm where it directs light from the lamps toward the assemblage. This support structure, which also constitutes a housing for a motor drive to the axial support and controls regulating an electrical energization of the motor drive and the lamps, is further displaceable and adjustable with respect to the platen so as to facilitate a requisite orientation of the lamps with respect to the photographic elements. A drive rotating the carrier arm causes light rays from the lamps revolved thereby to pas through the transparency, or film copy, at preset angles and expose the emulsion of the light sensitive surface, such as a recording film, spaced from the copy. The angles at which the light rays pass to the recording film can be controlled by the distance at which lamps are set apart and the distance the lamps are set from the platen. Use of a negative transparency, whereon the opaque symbols of the normal pictorial representation appear as transparent areas delineated within opaque areas, allows light emerging from these symbol areas to spread outwards behind the opaque areas of the transparency, such that the recording film spaced behind the negative is thus exposed to expanded light rays representing the symbols. Thus, development and printing of the film obtains an enlargement of the symbol representation. Use of a positive transparency, whereon opaque symbols are represented normally, is in turn effective to diminish the resulting pictorial representation of the symbols. This is due to oblique light rays from the lamps falling behind the edges of the opaque forms of the symbols on the transparency so as to cause additional exposure of the recording film for the representation of the areas wherein the symbols are circumscribed, or defined, and a compensating reduction of the symbols. Further control of the exposures in either case can be accomplished by adjustments made in the illumination level of the lamps, including by the use of additional lamps, and length of the exposure.

In one of the procedures employing the revolving illuminator of the present invention the spreading or reducing of line width is selectively and predictably controlled to produce films for intermediate steps in the procedure. Combinations of these films and the original film representation are used as masks in such steps requisite to produce representations for different categories of symbols. A series of these resultant abridged representations can serve as input for digitized mapping information. Another procedure according to the invention adapts the revolving illuminator to directionally enhance contour lines on a representation which is made the basis for a series of masking and image reversal steps. Directionally oriented high-lighting and shading appear on a shaded relief map produced by this further procedure. A still further procedure utilizing the apparatus of the invention selectively enhances contour lines into a multiplicity of distinct coalesced showings in accordance with the relative densities of these contour lines on a topographic map. Again employing the apparatus, selective reductions of the coalesced showings are made to produce corresponding true edge representations of each of the showings, and by a series of image reversal and masking steps applied to these showings, a map is produced on which distinct zones of slope gradient ranges are readily distinguishable.

Accordingly, an object of the present invention is to provide methods for manipulating the form of lines and other portrayals in the production of enhanced and diminished graphic representations.

Another object of the invention is to provide an apparatus having utility for modifying the form of lines and other portrayals for delineation of characteristic elements of graphic representations from preexisting copy.

A still further object of the invention is to provide a method and apparatus to accomplish photomechanical modifications of contour lines for shaded relief, and slope gradient manifesting renditions in the production of maps from preexisting copy.

These and other objects and advantages of the present invention will become more fully apparent from the following detailed description of the invention set forth herein and from the accompanying drawing made a part hereof in which:

FIG. 1 is a generally pictorial side elevational view, with partial cut-aways, of a light controlling photographic manipulator apparatus embodying the features of the present invention;

FIG. 2 is a front elevational view, taken along line II—II in FIG. 1, of an adjustable light displacing mechanism constituting an illuminator station in the apparatus of FIG. 1;

FIG. 3 is a fragmentary elevational view, taken along lines III—III in FIG. 1, of a revolvable light-carrying structure in the mechanism more fully appearing in FIG. 2, and which is partly broken away to reveal electrical connections from this structure to other parts of the mechanism;

FIG. 6 is a general pictorial view of the apparatus in FIG. 1, in a state of adjustment where it is conditioned to function in connection with a relief shading procedure according to one feature of the present invention;

FIG. 7 is a fragmentary elevational view of the light carrying structure in FIG. 2, including a lamp support carriage operable thereon having affixed thereto, as a cooperable part thereof, a convertible lamp shade;

Figure 10:
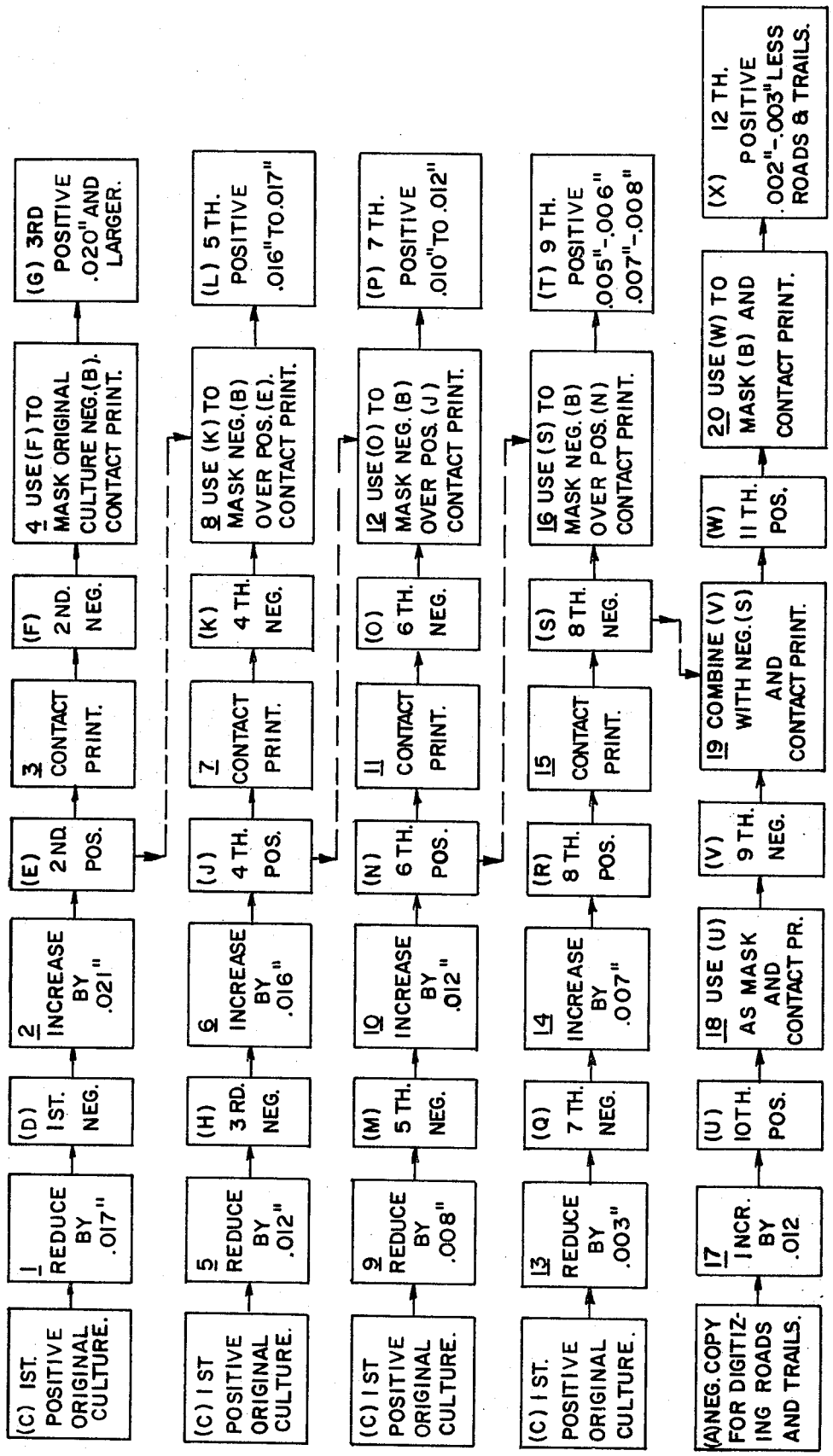

FIGS. 8A to 8J, inclusive, diagrammatically show relevant elements of a procedural sequence in accordance with the present invention which gives rise to a shaded relief map;

FIGS. 9A to 9F, inclusive, diagrammatically show relevant elements of a further procedural sequence in accordance with the present invention which gives rise to a color-keyed slope map; and FIG. 10 presents in tabular form the elements of a still further procedural sequence applicable to the preparation of mapping materials for analysis by scanning and digitizing procedures.

Reference is now made to FIGS. 1 and 2, for their illustration, by way of example, of an apparatus according to the present invention wherein an illuminator station 10 and a pictorial recording station 12 are cooperatively associated by reason of their spatial relationship on an extended underlying platform 14. As will hereinafter be more fully explained, station 10 is positionable on platform 14 whereas station 12 is positioned forwardly on the platform, or at the right end thereof as viewed in FIG. 1, and fixed thereat. Station 10 comprises as the major parts thereof a positionally adjustable console 16, and a lamp support panel 18 having a centrally affixed therein a coupling secured upon a shaft 20 by which the panel is maintained for rotation with respect to the console. A swivel mount 22, characterized by upright side walls 24 and 26 interconnected by a bottom plate 28, is provided in console 16 to hold suspended between the aforesaid side walls a generally rectangular cabinet-like enclosure 30. To the opposite side faces of enclosure 30 are separately affixed flanged ends of stub shafts 32 and 34, which are disposed thereby to extend outward from the enclosure into suitable bearing elements fitted within openings through side walls 24 and 26, respectively, of mount 22. A shaft 38, which is affixed at a central point on the underside of mount plate 28 to extend downward therefrom, is received in a vertical opening through a cylindrical flanged block 40 and a generally rectangular chassis 42 arranged thereunder to form therewith a pedestal base 44 for console 16. It will now be recognized from the structural arrangement thus far disclosed that enclosure 30 is designed to turn about a horizontal axis through shafts 32 and 34; and together with mount 22, rotate about a vertical axis through shaft 38. Also appearing from FIGS. 1 and 2, is that any excursion of enclosure 30 correspondingly displaces light support panel 18 carried thereon. Vertical adjustments tilting panel 18 to any angle from 0° to 90° are maintained by screw collar and lock nut devices 46 and 48 acting on threaded rods which are affixed to the side faces of enclosure 30, and project through arcuate slots 50 and 52 in the respective side walls of mount 22. Angular adjustments to console 16, and panel 18 along therewith, with respect to pedestal base 44, are held from displacement by a locking screw 54 which is operative in a threaded radial hole in block 40.

To the underside of chassis 42, and adjacent to each of the four corners thereof, is attached a roller assembly 58. In each such assembly a cylindrical roller 60 is mounted to rotate within an appropriate bearing bracket 62 which is in turn fastened to chassis 42. Set screws 64 within holes extending through chassis 42 are thus disposed to traverse holes in the respective bearing brackets and engage rollers 60 so as to restrin their action. Roller assemblies 58 are further arranged on chassis 42 to lie in parallel grooves running adjacent the side edges of platform 14. It is evident from FIGS. 1 and 2 that the parallel grooves constitute tracks 70 and 72 which are effective to guide any forward or rearward displacements illuminator station 10 may be made to take on rollers 60 to adjust the distance between an arrangement of illuminants on panel 18 and a photographic assemblage 80 carried by recording station 12. Maintaining assemblage 80 in the requisite positional relationship is a conventional vacuum frame 82 set up on a suitable support structure 84 which in turn is affixed to the forward end of platform 14, as was hereinbefore indicated. The illuminants on panel 18, appearing in FIG. 2, are light sources 88 and 90, for which Quartzline lamps are particularly suitable. Provisions are made for displacing these lamps along opposing radial arms 92 and 94 of panel 18 such that the positions thereof with respect to each other and to the central axis of shaft 20 may be adjusted as required by the procedures hereinafter described in detail. Thus, corresponding composite tracks 102 and 104 are made applicable by centering them on radial medians of panel arms 92 and 94, respectively, where they extend from adjacent the respective end edges of panel 18 to an enlarged central area 105 of the panel. Strips of electrical insulation 106, such as phenolic board or the like, are fitted between electrically conductive rails 108 and 110 and 112 and 114 comprising tracks 102 and 104, respectively. Also, as appears in FIG. 3, further insulator strips 115 contacting the respective rails provide insulation separating the tracks from the surface of panel 18 to which they are secured by insulated fasteners of conventional design. The conductive rails employed in this instance are suitable lengths of channel stock which are disposed spaced apart with open sides thereof faced toward the extended edges of the respective panel arms 92 and 94. Outer side flanges of the channel stock are thus disposed for engagement in conforming slots of block-like carriages 116 and 118 on which are affixed appropriate lamp sockets for light sources 88 and 90, respectively. It is evident that other carriages for additional lamps, as required, are in like manner readily accommodated by this flanged construction.

On each of the aforesaid carriages electrical connections from the lamp socket extend to separate conductive tabs which are exposed in the respective conforming slots of the carriage block so as to complete by sliding contact on the rails engaged with the slots a circuit wherein the lamp in the socket is energized by way of conduction across the rails. A commutator device 120 appearing in FIG. 1, and in further detail in FIG. 3, functions to transfer electrical power from a conventional source thereof to a circuit applying such power across tracks 102 and 104. Electrical brushes 122 and 124, which are affixed in the forward wall of enclosure 30, project forwardly therefrom so as to pressure-contact conductive rings 126 and 128 of the commutator. The rings, which present suitably wide conductive surfaces for contact by the brushes, are arranged on an insulator disk 130 secured to the rearward side of panel area 105 and spaced in concentric relationship with the panel support shaft 20. Insulation material of disk 30 appears in further rings 132 and 134, interposed between and around conductive rings 126 and 128. Joining tracks 102 and 104 to the commutator are leads 138 and 140 which couple rails 108 and 112 to conductive ring 126, and leads 141 and 144 which couple rails 110 and 114 to conductive ring 128. Commutator 120 accordingly facilitates energization of light sources 88 and 90 by way of the conductive rails across which the respective lights are connected in parallel. Moreover, the arrangement heretofore disclosed allows unimpeded rotation of panel 18 by a drive to shaft 20 which extends into enclosure 30 through a journal bearing 152 fitted into the forward wall of the enclosure. A relatively large pulley 154, keyed to the enclosed end of shaft 20, is provided to transmit a rotational drive to panel 18 from a variable speed motor 156 which is adapted to activate the pulley by way of a conventional belt link 158. Motor 156, as well as commutator brushes 122 and 124, receive electrical energy via cable 160 connected to the conventional power source, by way of a power supply arrangement which includes a junction box 162, and leads 164, 166, and 168 which extend therefrom to the motor, and brushes, respectively. Incorporated in the aforesaid power supply circuitry by way of the junction box 162, and a variable autotransformer connected therein, in a manner well-known in the art, are on-off switches, and motor speed and lamp illumination brightness controls indicated in FIG. 1 by knobs 170.

Figure 4:
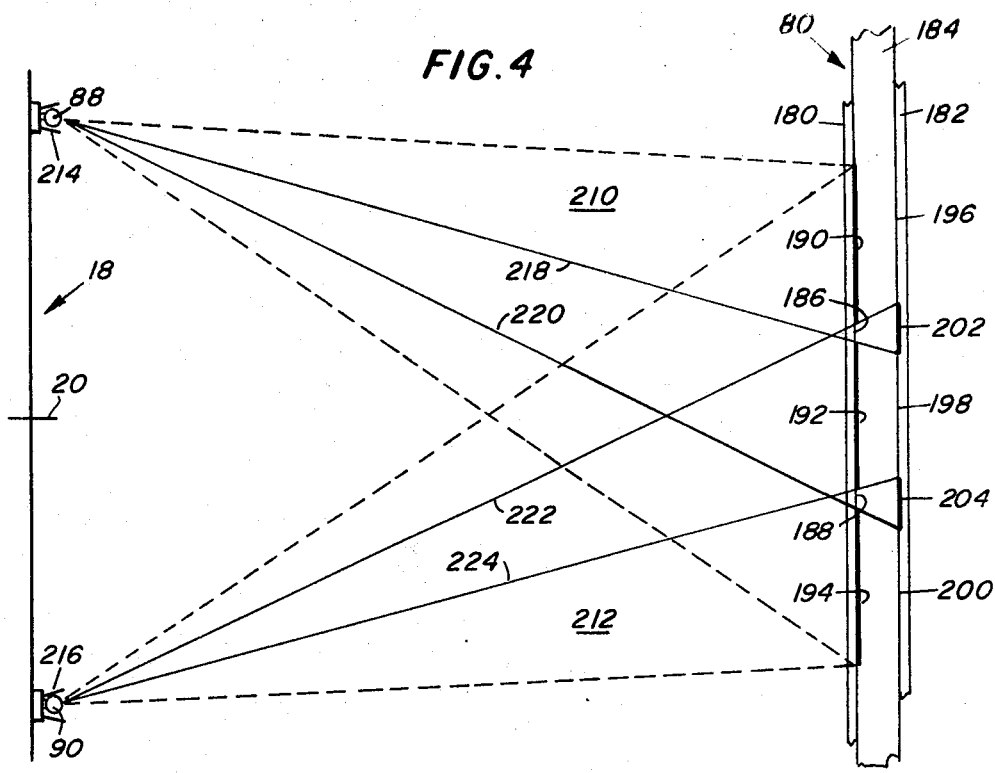
FIGS. 4 and 5 are schematic representations which implement disclosures of basic operational principles of the invention underlying enhancement and reduction of photographically represented image forms, respectively.

A fundamental procedure according to the present invention having applicable therein an embodiment of the invention, such as previously disclosed with reference to FIGS. 1 to 3, is commenceable when vacuum frame 82 is disposed as shown in FIG. 1 with assembly 80 maintained thereon squarely facing the light radiated from illuminator station 10. With reference now to FIG. 4, assemblage 80 is seen as a layered structure combining a sheet of photographic copy 180 and a light sensitive or actinic film 182 in contact respectively with the opposite sides of a transparent spacer 184. This assemblage is disposed as hereinbefore indicated such that light from the illuminator station reaching film 182 is characterized by its prior interception in copy material 180 and spacer plate 184. As will be hereinafter more fully explained, either a negative or positive transparency has utility in assemblage 80 as copy material, depending on whether a line weight manipulation is designed to increase or decrease the line weight. For illustrating the influence of revolving light from station 10 upon an assemblage 80 with which line weight increase is to be accomplished, the FIG. 4 arrangement is shown having a negative transparency as copy material 180. Clear areas of copy 180 are indicated by normal weight lines 186 and 188, whereas surrounding opaque areas appear as heavy line representations 190, 192, and 194. Similarly, the composition of the photographic positive arising from an exposure of film 182 is represented on this film with normal weight lines 196, 198, and 200 for clear areas, and heavy lines 202 and 204 for distinguishable imagery, or dark areas. Panel 18 is represented in FIG. 4 as being revolved by shaft 20 so as to carry lamps 88 and 90 in a circular path and thereby expose the assembled photographic elements to light beamed within cones 210 and 212 indicated by dashed lines. The aforesaid beamed light is hooded by flexible shade devices 214 and 216, as indicated, to limit the deleterious effects of stray light reflections. However, as will be hereinafter more fully disclosed in connection with further procedures according to the invention, these shades are adapted for reshaping to allow light beamed radially to reach a photographic assemblage.

As further indicated in FIG. 4, cones 210 and 212 combine into transmitted light, including rays 218, 220, 222, and 224, which pass obliquely through transparent areas 186 and 188 of negative copy 180 and spacer 184 so as to expose specifically defined areas of the light sensitive emulsion on film 182. Such exposed areas 202 and 204 of film 182 are consequently latent enlargements of the controlling transparent areas on negative copy 180. Accordingly, when panel 18 is driven a hereinbefore explained, lamps 88 and 90 are caused to follow circular paths such that segments of the resultant light path which reach film 182 by traversing transparent areas 186 and 188, and spacer 184 cause exposure of film 182 in the correspondingly shaped areas 202 and 204 thereon and which are consequently enlarged fully around in the film plane. Further, by obtaining extended circular paths for lamps 88 and 90 with increased diametrical spacing between them, the sweep of the light path reaching film 182 is widened and additional enlargement is achieved. The adjustability of carriages 116 and 118 on tracks 102 and 104, evident from the construction depicted in FIGS. 1 and 2, facilitates extensions of the light path for purposes of increasing the weight of lines such as represented on negative copy material 180. The securing of carriages 116 and 118 in adjusted positions is enabled by knobbed set screws 226 and 228, respectively, in an obvious manner. It should now also appear from the showings in FIGS. 1 and 4 that by reducing the distance between the light source on panel 18 and the light sensitive surface in assemblage 80, light reaching such surface is further spread thereon due to the additional obliqueness imparted to the geometry of the light rays emerging from the clear areas of the negative copy material 180. Thus, forward displacements of illuminator station 10 facilitated by its roller assemblies 58, and platform tracks 70 and 72, allow further control over line weight manipulation. On the other hand, restoration of line weight toward that actually defined in the negative copy material, would be served by shortening the diametrical distance between the lamps and rearwardly displacing station 10 from assemblage 80. Line weight increase also follows as a result of replacing spacer 184 with another that is thicker. As is also evident from the aforesaid light ray geometry in FIG. 4, spacer thickness determines the base area of the light cones emerging from clear areas of negative copy 180, and therefore the amount of spread light available for exposure of film 182.

Figure 5:
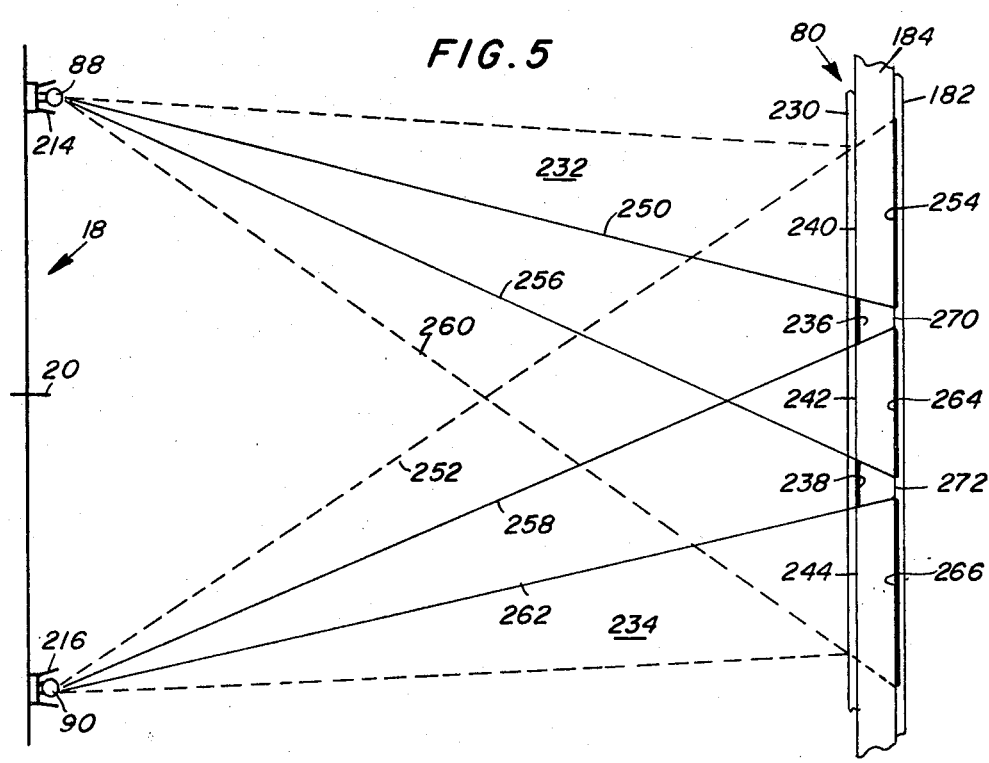

Line weight reduction, or thinning, is exemplified with reference to the showing in FIG. 5 where the lines of interest are on a positive transparency 230 which in this instance is applied as the photographic copy material in an assemblage 80. Source light is again represented by cones 232 and 234, delineated by dashed lines in FIG. 5. Positive copy 230 carries opaque areas 236 and 238 indicated by heavy lines, and clear areas 240, 242, and 244, indicated by normal weight lines. Light in cones 232 and 234, indicated by ray 250 in cone 232 and ray 252 in cone 234, combines in merged light which traverses clear area 240 of the positive copy and spacer 184, and effectuates the exposure of the light sensitive surface of film 182 on an areas 254 indicated by a heavy line. Correspondingly, cones 232 and 234 provide merging light indicated by their respective rays 256 and 258, and 260 and 262, which traverse clear areas 242 and 244, respectively, of the positive copy, and spacer 184, and effectuates exposure of film 182 on areas 264 and 266, indicated by heavy lines. Consequently, the processing of film 182 shown in FIG. 5 results in a negative transparency which provides the showing previously indicated therefor, namely darkened areas 254, 264, and 266, which, as is apparent from the showing in FIG. 5, define between them clear areas 270 and 272. Thus, the creation of this resultant negative as the basis for a contact print is productive of a showing whereon light areas are representative of darkened or opaque areas of the resultant negative which correspond in form to areas 236 and 238 of positive copy 230, but which are of lesser weight than their counterparts on the positive copy. Considerations of light ray geometry similar to that previously noted with reference to FIG. 4, should therefore make evident that by revolving lamps 88 and 90, re-orientation is imparted to light reaching the actinic surface of film 182, shown in FIG. 5, with the result that those film areas exposed to light are enlarged at the expense of the resultant complementary areas 270 and 272 which are diminished, and wherefore they allow lesser matching areas on the prints made from the film negative. Measurable reductions in line weight are further attainable by adjustments of lamp carriages 116 and 118 with respect to panel 18 which increase the diametricle distance between lamps 88 and 90, and by repositioning illuminator station 10 relatively closer to recording station 12. An additional procedural alternative to lighten line weight according to the present invention, substitutes for the spacer plate 184, one of lesser thickness.

The period of exposure and the intensity of illumination are significant in the use of the revolving illuminator to manipulate line weights. With image movement involved, each portion of negative copy acts as an individual aperture, the wider the line the larger the aperture. Thus, if each portion of the recording film is to get equal exposure to form a sharp image, it is evident that narrow lines must get more exposure than wider lines, either through a longer exposure time, or through an increased level of illumination. As an example, with predetermined settings of the apparatus, it takes 10 seconds to increase a 0.003 inch line by 0.004 inch to obtain a resultant 0.007 inch image. It takes an exposure of 160 seconds to increase the same 0.003 inch line by 0.190 inch. With the same settings on the equipment it takes 8 seconds to increase a 0.007 inch line by 0.004 inch, and 140 seconds to increase the 0.007 inch line by 0.190 inch. When exposure time becomes critical, as in very short exposures, it is desirable to acquire more temporal latitude. Thus, it is convenient to lengthen the exposure time by making a corresponding decrease in illumination level. Where exposures become exceedingly long, i.e., 160 seconds, it benefits processing to shorten exposure time by making a compensating increase in the level of illumination.

The procedure based on revolving lights, as was hereinbefore explained, is further adapted for isolating spot symbols of various sizes. This spot isolating technique is demonstrable using, as copy material, a negative transparency wherein clear areas representing a small dot and a large dot are present; and which is to be processed to isolate the small dot from the large one. Employing, for example, the apparatus disclosed in FIGS. 1 to 3, this negative transparency, a spacer, and an actinic film providing a positive transparency, are assembled on vacuum frame 82 in the manner heretofore explained. A requisite diametrical distance between lamps 88 and 90 is set, along with a positional relationship between illuminator station 10 and recording station 12 so as to cause, by revolving lamps 88 and 90, exposure on the actinic surface of the film a latent image of a small dot in the form of a clear or open circle, and of the large dot in the form of a darkish or filled-in circle. The resultant positive transparency having the aforesaid images processed thereon is thereafter used as a mask upon the negative transparency copy. A print made of the masked copy is therefore without a showing of the large dot since it is eclipsed by the filled-in circle of the mask, whereas since the small dot registers with an open circle on the mask, it is shown distinctly defined within that open circle.

The development of shaded-relief topographic maps is also facilitated by a further adaptation of the present invention to cartographic work. Relief shading on topographic maps directs attention to physiographic features of special interest with shading which accentuates these features. More specifically, the appearance of sunlight and shadows on the terrain is simulated by the shading to convey an illusion of a three-dimensional land surface. Heretofore illusion creating shading on topographic maps has been rendered by airbrush and similar hand-rendering techniques in the manner disclosed in an article entitled "The Relief Contour Method of Representing Topography on Maps" by Kitiro Tanaka in *Surveying and Mapping*, Volume II, No. 1, 1951. In brief, the present invention is a manual-photomechanical procedure in which, following an initial selection of the direction of illumination, a mask is manually constructed for use in separating illuminated slopes from shaded slopes. A negative image of the contour lines is then subjected to a line-enhancing process, somewhat in the nature of but differing from that previously explained with reference to FIG. 4, in which contours are thickened only in the direction of illumination and shading. Thereafter, in a series of photographic steps, the mask, the enhanced contours, and a 40-percent screen are combined on a film to create a print which conveys a three-dimensional illusion. This composite print is used as copy for further processing wherein continuous-tone film is exposed through a sandwich assemblage of the composite copy, a translucent diffuser, and a 0.1 inch transparent spacer. In this manner the varying tones on the illuminated and shaded slopes are effectively blended with the background tint. Reproductions of the resultant shadings can be made in half-tone and overprinted on copies of the basic topographic map.

To more fully consider the instant manual photomechanical procedure, reference is now made to FIGS. 6 and 7, wherein the apparatus illustrated in FIGS. 1 to 3 is shown requisitely adjusted to carry forward the procedure, and FIGS. 8A to 8J, inclusive, wherein an example of the procedure appears illustrated by photographic materials developed in accordance with the procedural steps. Preparation of the apparatus for this particular example of the procedure, to be hereinafter more fully set forth, places enclosure 30 horizontally disposed by support on stub shafts 32 and 34, whereat it is secured by lock devices 46 and 48. Lamp whirling panel 18 is thus disposed for rotation in a horizontal plane and light from lamps 88 and 90 is directionally corresponded to sweep horizontally by adjustments made to the flexible shade devices 214 and 216. These shade devices have generally conical or flared out configurations in the one half thereof spaced facing the rotational center of panel 18, and a generally cylindrical configuration characterizing the other half. Reference to the exemplary shade device 214 appearing in FIG. 7, reveals separable quarter-round, complementary sections 302 and 304, constituting the cylindrical half of that device, as pivotally connected along edges 308 and 310 thereof, respectively, to the terminal edges of a conical half 312 of the device. Further, each section is seen to be an articulated arrangement of three arcuate segments of a cylindrical surface, which enable such sections to be reshaped when turned on their pivotal connections into upright parallel side walls 314 and 316, as indicated by the dashed lines in FIG. 7 Side walls 314 and 316, together with the surface of conical half 312, form in part a channel wherefrom light is emitter radially toward recording station 12. Stability for side walls 314 and 316 is established by elongated pins 318 and 320, respectively, which slide in tubular openings formed by rolled edges on the extended ends of the walls and fit into conforming depressions 322 and 323 on lamp carriage 116. A thin, rigid ledge 324, attached to project out from conical half 312, at the peripheral edge thereof, is surmounted by a slightly wider plate 326 having inwardly turned, half-round side edges which grip the ledge and hold the plate thereto in a sliding engagement therewith. As is evident from the dashed-line showing of plate 326 in FIG. 7, it is adapted, when fully adjusted to overlap the edges generally aligned in forming walls 314 and 316, as well as the heads of pins 322 and 323 therein, to provide an upper light cover which completes the aforesaid radial light-emitting channel.

Figure 8A:
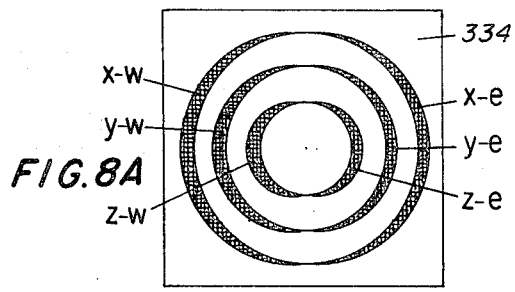
Figure 8B:
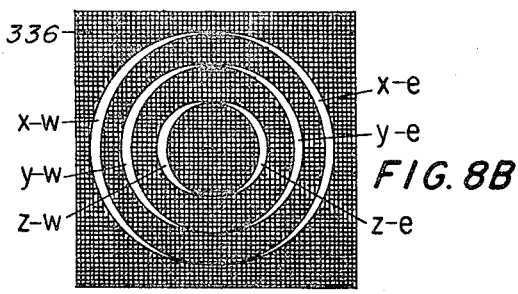
Figure 8C:
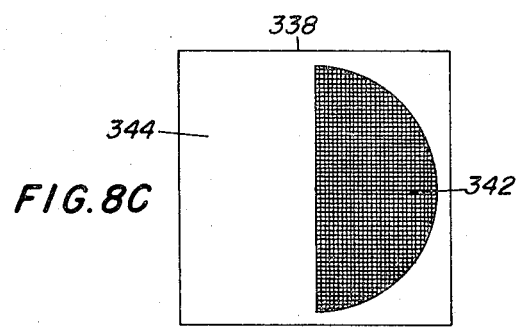
Figure 8D:
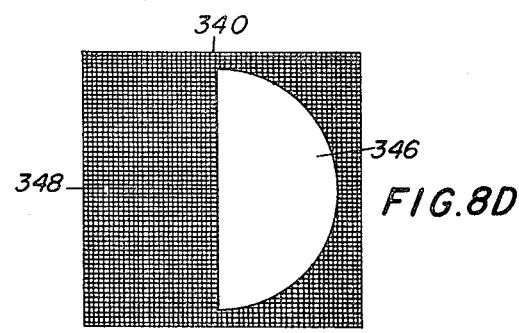

Examined herein as an example of material treated for relief shading in accordance with the aforesaid procedure is a map having inscribed thereon three generally concentric circular contours, x, y, and z, indicative of hilltop terrain. Consequently, the objective of the procedure now considered is to derive a map showing terrain slopes defined by these circular contours as they appear lighted from a predetermined direction. Chosen to characterize the slope formations in this example is light coming from the west, or directed left to right in the maps of FIGS. 6, and 8A to 8J, inclusive. Thus, to be obtained are highlighting on the showing of western slopes and shading on the showing of eastern slopes. The appertaining map is first copied as a negative transparency 330 featuring contours x, y and z as clear lines upon an opaque background b. Negative transparency 330 is made the copy in an assemblage 332, which, as indicated in FIG. 6, is vertically held on vacuum frame 82 to face the edge-whirled light sources at illuminator station 10. The illuminator is enabled to simulate an east-west lighting situation by repositioning upright console 16 in a 90° rotational adjustment about the vertical axis defined by shaft 38, and a still further adjustment by tilting upright console 16 backwards 90° about the horizontal axis defined by shafts 32 and 34. Panel 18 is thus positioned to edge-whirl its lighting in a plane which defines an east-west sweep upon assemblage 332. As an illustrative setup a one-sixteenth inch spacer separates the negative contour copy from the recording film; lamps are positioned 58 inches apart on the edge-whirled panel whose driving shaft is spaced nine feet from the copy. The six second exposure in this instance provided enhancement of about 0.013 inches in the pre-selected direction. Such enhancement limits coalescence to the more-densely spaced contour lines that represent the steepest east-west slopes. These slopes theoretically should receive both maximum illumination and shade in the final graphic, as would be provided by such coalescence of lines. Consequently, the arrangement and cooperation indicated hereinabove produces, in the manner heretofore explained with reference to FIG. 4, a positive transparency 334 on which appear enhanced portions x–e, x–w, y–e, y–w, and z–e, z–w, of the contours which extend east and west, as more fully appears in FIG. 8A. Positive 334 is then applied to produce by contact printing a negative transparency 336, illustrated in FIG. 8B, wherein the enhanced portions are transparent on an opaque background. Masks 338 and 340 are made, such as by hand painting or the like, which in the first instance would register an opaque surface with the eastern half of the contour area, as illustrated in FIG. 8C by an opaque semi-circle 342 on a transparent background 344, and in the second instance would register a transparent surface with the eastern half of the contour areas, as illustrated in FIG. 8D by a transparent semi-circle 346 on an opaque background 348. The parts 346 and 348 would normally be derived from contact printing parts 338 and 342.

Figure 8E:
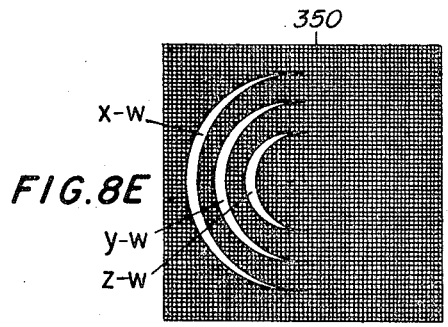
Figure 8F:
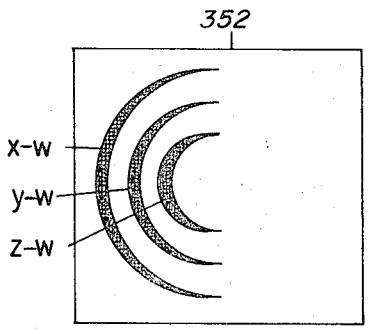
Figure 8G:
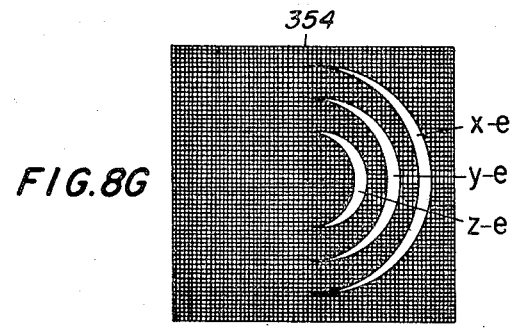

Subsequent steps of the relief shading procedure are as follows:

Mask 338 is registered over negative transparency 336 to produce a composite negative 350, appearing in FIG. 8E, from which is contact printed a positive transparency 352, appearing in FIG. 8F. As is evident from these figures of the drawing, mask 338 restricts the transparency of negative 350 to western contour portions x–w, y–w, and z–w, wherefore its contact positive 352 is opaque at corresponding contour portions x–w, y–w, and z–w.

Negative transparency 336 is removed from under mask 338, and instead it is applied under reversal mask 340 to produce a composite 354 wherein transparent area 346 of the latter mask is registered with the eastern half of the composite's contour area. Thus, the remaining transparent areas on this composite represent the enhancement of eastern slope contours x–e, y–e, and z–e, as appears in the showing of FIG. 8G.

Figure 8H:
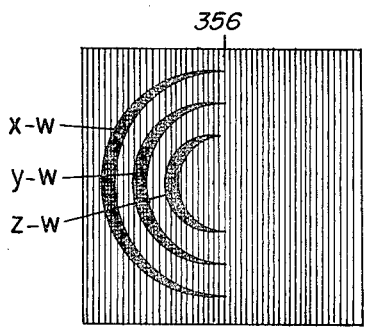
Figure 8I:
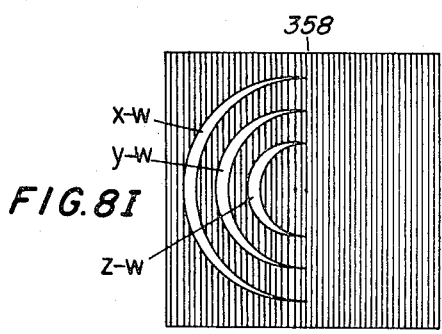

To establish a tonal background for the slope presentations in the final product, particularly with respect to the highlighted areas thereon, a 40 percent screen is stacked in contact with positive transparency 352 to provide a modified positive transparency 356, which is represented in FIG. 8H with intermediate shading. Subsequently, composite transparency 356 is applied as copy material such that it would produce by contact print-ing a partially transparent film 358 which, as indicated in FIG. 8I, would contain transparent representations of western slopes x–w, y–w, and z–w upon a 40 percent grey tinted background. However, the material retaining the image for film 358 is again processed by a further contact printing thereon wherein negative transparency 354 is employed as copy. References to FIG. 8J reveals the final product as a transparency film 360 which contains the desired representations, including highlighted western slopes x–w, y–w, and z–w, and shaded eastern slopes x–e, y–e, and z–e, contrasted upon a grey tinted background b. A diffusion-exposed transformation of film 360 is advantageously applicable to overprinting shading on a conventional topographic map. This transformation is made with an assemblage in which an unexposed commercial continuous tone film is placed emulsion side up and contacted with a one-tenth inch transparent spacer, made of plexiglas or the like, surmounted by a translucent diffuser, such as a Loftrite type, having overlaid thereon film 360 with its emulsion side down. Exposure of this assemblage through film 360 produces a negative transparency characterized by a three-dimensional illusion of the shaded relief contours.

It is evident from the foregoing that a relief shading procedure, as disclosed herein, is applicable to simulate sun illumination effects from any selected direction, and that lighting intensity can also be selectively simulated over a mapped area to create further illusions of depth and distance. For example, a north-south lighting is enabled for the procedure by a 90° rotational adjustment of an upright console 16 about the vertical axis defined by shaft 38. Panel 18 is thus positioned to edge-whirl its lamps in a plane which defines a north-south sweep upon an assemblage maintained on vacuum frame 82. The assemblage is appropriately located on the vacuum frame to align the map in the plane swept by the light path. Intermediate adjustments of the console on shaft 38, as well as of enclosure 30 on shafts 32 and 34, can be made to position panel 18 and its movable lamps 88 and 90 as required to accomplish a wide variation of relief shading effects. Lamp shades 214 and 216 are suitably shaped by repositioning side walls 314 and 316 as may be required for enhancing the contour lines on a map. Lamp carriages 116 and 118 are provided with additional conforming depressions, such as appears in FIG. 7 between outer depressions 322 and 323, to receive the pins stabilizing the walls of the lamp shades so as to facilitate an intermediate shape for these walls.

A still further procedure based on the principles of the present invention recreates the showing of a conventional topographic map in a form where indications of slope gradients are readily perceived by reference to zonal indicants on the map. More specifically, predetermined ranges of slope gradients are each identified with a respective one of a number of gradient zones each of which is distinguishable one from the other by a gradation of shading or coloring on the map. In essence, this procedure functions to implement the design of each zone by merging contour lines falling within a particular range of line densities wherever they occur on the map. The expediency of this approach becomes evident when it is recognized that the relative closeness or density of the contour lines, which are part of the conventional symbolism of topographic maps, is directly indicative of slope gradients.

The development of a slope map pursuant to the procedure of the present invention is accomplished as follows:

An original rendering of the topographic map is copied by photomechanical techniques, or the like, to represent the true form of the contour lines of the map with transparent lines on a negative transparency. A requisite modification of this negative to bring all lines thereof to a uniform weight, free of numbers, spot elevations and other disruptive symbols is made by dropout processing as was hereinbefore described. For example, the heavier indexing contours appearing at fixed intervals among the regular contours are eliminated by line weight reduction using the procedure set forth herein with reference to FIG. 5. In this connection a reversal of the true form negative provides a corresponding positive transparency which is applied as copy in the procedure referenced to FIG. 5, and by this line thinning procedure all contour lines of a weight less than the heavier indexing contours are eliminated. A reversal of the resultant negative transparency provides a positive transparency having contour lines limited to those derived from the reduced indexing contours. This limited showing on a positive transparency is thus applicable as a mask to suitably diminish the weight of the transparent line representations of the indexing contours on the true form negative. A contact print made using the resultant composite transparency as copy gives rise to a positive transparency which in turn is also copied to provide a harmonized negative transparency wherein all contours are transparent lines of equal weight.

Having determined beforehand the gradient ranges constituting the several zones chosen for the slope map, the zone of steepest gradients is initially selected for processing. Thus, the apparatus identified with FIGS. 1 and 3 is activated with the aforesaid harmonized negative transparency applied as copy in assemblage 80, and a procedure in accordance with the disclosure previously set forth with reference to FIG. 4 is executed to obtain a controlled enhancement of the contour lines shown on the negative. More specifically a line enhancement is effectuated wherein only the contours of the steepest gradient zone are coalesced into general areas of opacity on the resultant positive transparency.

The harmonized negative transparency is again used as copy for a further recording film in assemblage 80, and the line enhancement procedure identified with FIG. 4, is employed as previously explained, to produce a second resultant positive transparency whereon contour lines have been enhanced to a point where the contours of the next to the steepest gradient zone are also coalesced into general areas of opacity. Subsequently, the contours of all other contemplated gradient zones appearing on the aforesaid harmonized negative are correspondingly separately processed in a descending order of their relative steepness with respect to the contours of the next-to-the steepest gradient zone to produce additional resultant positive transparencies whereon appear the coalesced contours of these other gradient zones. The different degrees of enhancement corresponding to the procedure's order of development are coarsely determinable by interchanging the spacer in assemblage 80 with others of different thicknesses as is necessary to secure requisite enhancement. Finer line weight distinctions are made with adjustments changing the distance between lamps 88 and 90 along lamp-revolving panel 18, and between illuminator station 10 and recording station 12.

It will be recognized that the showing on each of the aforesaid resultant positives made after production of the first such positive for the steepest gradient zone, includes in addition to the coalesced area for a gradient zone identified with it, other enlarged coalesced areas which correspond to the further steeper gradient zones of the map. For purposes of illustration, FIG. 9A schematically presents four such resultant positive transparencies 370, 372, 374 and 376, as separately characterizing respectively the terrestial scope of four different gradient zones which when viewed from left to right in the figure correspond to a descending order of steepness. Accordingly, in transparency 370, only the top shaded circle is of interest with respect thereto, whereas the sole areas of interest in transparencies 372, 374 and 376, are their shaded circles in the second, third, and fourth positions from the top, respectively. Now, in the further course of the instant procedure, these positive transparencies are applied in a contact printing process wherefrom are produced four corresponding negative transparencies 378, 380, 382, and 384, as indicated in the showing of FIG. 9B. However, each of resultant positives 370, 372, 374, and 376, is also processed according to the procedure previously disclosed with reference to FIG. 5, whereby the images thereon are thinned down or compressed to the true edge of that zone which is identified therewith. Accordingly, it will be seen by reference to FIG. 9C, and negative transparencies 386, 388, 390 and 392 illustrated therein as the products resulting from the thinning down procedure, that in each of these transparencies the coalesced image specifically identified with the zone represented by that transparency has been effectively eliminated by the thinning down procedure. This resultant effect more strikingly appears when FIG. 9D illustrating positive transparencies 394, 396, 398 and 400, made by contact printing employing negative transparencies 386, 388, 390 and 392 as copy, is compared with the original resultant positive transparencies 370, 372, 374, and 376.

Having made available the several transparencies disclosed with reference to FIGS. 9B and 9D, the instant procedure is carried forward by applying positive transparencies 394, 396, 398 and 400, as masks on negative transparencies 378, 380, 382, and 384, respectively, so as to establish composite transparencies 402, 404, 406 and 408, which appear as indicated in FIG. 9E. Consequently, composite transparency 402 remains clear only in that portion thereof corresponding to its area of interest, or that which manifests the territorial extent of the gradient zone associated therewith, whereas composite transparencies 404, 406 and 408 remain clear only in those portions thereof which correspond to their areas of interest. Accordingly, these composite transparencies, or singular negative transparencies derived therefrom in a conventional manner, are adaptable for use with different color layers or bands to produce by printing a slope map wherein different gradient zones are distinguishable by their coloration in the manner indicated in FIG. 9F by map 410. Lithographic prints can also be prepared from these transparencies using either overlays or by combining various colors, in a manner well known to the art.

Line compression and isolation techniques, such as are hereinbefore disclosed, have special utility in preparing topographic maps for analysis by automatic scanning and digitizing techniques. Since in topographic maps the culture symbols, such as roads, buildings, tanks, railroads and the like, are shown characterized by distinguishably different predetermined uniform line sizes, the map content including these symbols can be categorized for purposes of analysis by producing, in accordance with the techniques of the present invention, a number of maps having correspondence to line sizes. Exemplary of a procedure providing copy for digitizing culture symbols of a size 0.020 inch and larger, effectively isolating or separating them from symbols of a size 0.017 inch and smaller, is a sequence of steps (1) to (4) in an outline which follows having reference to FIG. 10.

1. Proceeding as was previously explained in connection with the symbol isolation technique and the procedure referenced to FIG. 5, a first positive transparency (C) is employed, which shows the original culture symbol content initially appearing on a negative (B), to effectuate a reduction of all line weights thereon by 0.017 inch, and to produce a first negative (D) in which all symbols that are 0.017 inch and smaller are dropped out. Symbols remaining on the negative (D) are in the form of diminished versions of those symbols which originally are 0.020 inch and larger.

2. Proceeding as was previously explained in connection with FIG. 4, the aforesaid first negative (D) is employed as copy to increase all line weights by 0.021 inch. Thus, produced for use as a mask herein is a second positive (E) containing symbols originally of a size 0.020 inch and larger which have been increased in line weight by 0.004 inch more than their original size. These over-sized masks are intended to prevent light transmission around symbols requiring masking, and is a feature common to each of the subsequent masking steps hereinafter described. Because numerous symbols are reduced in step (1) to about 0.003 inch square (or round), increasing them by 0.021 inch is done cautiously to avoid generating such symbols as open circles as heretofore described. Repositioning of lamp 88 and 90 on panel 18 is done as required for successive exposures so that the centers of the symbols are completely exposed.

3. The mask of step (2), or second positive (E), is used as copy to make a contact reversal mask, which is designated herein as a second negative (F).

4. Using the original culture negative (B) as copy, which, as was hereinbefore indicated, is identical in all respects to symbols of starting positive (C), except being a reversal thereof, and masking it with the second negative (F), produce a contact print, constituting a third positive (G), which contains copy for digitizing symbols of a size 0.020 inch and larger.

In continuing the procedure to provide a copy for digitizing all symbols of sizes 0.016 and 0.017 inch, and of subsequent dimensionally grouped symbols of lesser sizes, the following steps, which are also diagrammatically illustrated in FIG. 10, are taken.

5. In steps through (16), the procedure followed is the same as in steps (1) through (4), namely, the first positive (C) is repeatedly applied as copy to effectuate in turn a reduction of all line weights therein by 0.012 inch, 0.008 inch, and 0.003 inch, so that by the succeeding sequences set out in FIG. 10 films (L), (P), and (T), are made copy for digitizing symbols 0.016 inch and 0.017 inch, 0.010 inch and 0.012 inch, and 0.005 inch through 0.008 inch, respectively. It will be noted from examination of FIG. 10 that steps (8), (12), and (16), produce digitizing films (L), (P), and (T), by employing films (E), (J), and (N), produced in steps (2), (6), and (10) respectively, as insertions which serve as masks to effectively block out all symbols in the next larger category. However those certain symbols of a size 0.020 inch and larger will be of identical size, shape, and position as they are on negative B, since the exposing light has passed through only those enlarged symbols (apertures in this case) that are retained on negative F. All remaining symbols on negative B are effectively masked during the exposure of positive G by the residual opaque portions of negative F.

Completion of the procedure to provide copy for digitizing all symbols of sizes 0.002 inch and 0.003 inch, less symbols of roads and trails, is accomplished by the following steps which have further references to FIG. 10.

17. A negative copy (A) for digitizing roads and trails, which can be prepared by any one of several different known cartographic methods, is applied as copy to effectuate an increase of all line weights thereon by 0.012 inch, and produce an over-sized positive image, designated herein as a tenth positive (U), showing the complete road and trail system.

18. The product step (17), or tenth positive (U), is used as copy to make a contact print negative, designated herein as a ninth negative (V).

19. Using the ninth negative (V) together with the eighth negative (S) by, in turn, separately contact printing each such negative in register on the same film, combined images are produced for a combined positive mask. This mask designated herein as an eleventh positive (W), contains an enlarged version of the road and trail system and enlarged versions of all symbols of a size 0.005 inch and larger.

20. Using the aforesaid original culture negative (B) as copy, and masking it with the eleventh positive (W), a contact print is produced which constitutes a twelfth positive (X) containing copy for digitizing symbols of sizes 0.002 inch and 0.003 inch, less those for roads and trails.

While preferred forms of the physical embodiments and procedures of the invention has been illustrated and described herein, it will be understood that the invention is not limited thereby, but is susceptible to change in form and detail.

What is claimed is:

1. A method for manipulating the representation of a photographic image wherein an initial form of said representation is transformed into a final form of said representation whereon characteristics of linear and planar shapes of said image are predetermined variants of characteristics defining linear and planar shapes on said initial form, the steps comprising, combining in contacting layered arrangements, in sequence, at least said initial form of said representation, a transparent spacer, and material having a light sensitive surface, facing said layered arrangements at light radiated from a plurality of spaced sources thereof, which are revolved about a point between at least two of said sources so as to enable continuous traverses of said light across and through seriate portions of said initial form of said representation and said spacer wherefor such light reaches said light sensitive surface, and photographically processing said exposed light sensitive surface to produce therewith and therefrom said final form of said representation.

2. The method of claim 1 wherein said initial form of representation is a negative transparency, and said processing comprises developing a resultant exposure of said light sensitive surface of said material to produce a positive transparency wherein said linear and planar shapes of said image are enhanced versions of linear and planar shapes on said initial form of said representation.

3. The method of claim 1 wherein said initial form of representation is a positive transparency, and said processing comprises, developing a resultant exposure of said light sensitive surface of said material to produce a negative transparency whereon said linear and planar shapes of said image are diminished versions of linear and planar shapes on said initial form of said representation.

4. The method of claim 1 wherein said initial form of said representation is a transparency copy containing within a substantially opaque background a conformation of transparent areas indicative of a topographic map having contour lines of generally uniform thickness, and wherein said light radiated from a plurality of spaced sources thereof and faced by said layered arrangement, is revolved about a point between at least two of said sources in a plane which in an intersection with surfaces characterizing the planar disposition of said contacting layers in their facing relationship to said lights, defines significantly less than a straight angle, and said processing comprising, developing a resultant exposure of said light sensitive surface of said material by said radiated light to produce a first positive transparency wherein said contour lines are enhanced in predetermined diametrically opposing directions, producing by contact printing employing said first positive transparency as copy, a first negative transparency containing a showing in transparent images of said enhanced contour lines, producing a further transparency containing an opaque area corresponding to an area within a predetermined portion of said topographic map containing said contour lines, which directionally coincides with a predetermined one of said diametrically opposing directions, producing by contact printing, employing said further transparency as copy, a reversal transparency of said further transparency, applying said further transparency as a mask on said first negative transparency, and by contact printing employing said masked first negative transparency as copy, producing a second positive transparency whereon appear as opaque images only said contours of an area corresponding to an area within a predetermined portion of said topographic map containing said contour lines, which directionally coincides with the other one of said diametrically opposing directions, applying said reversal transparency of said further transparency as a mask on said first negative transparency to provide a further masked negative transparency, and by a two-step contact printing employing firstly said second positive transparency in contact with a screen of intermediate shading as copy, and secondly said further masked negative transparency as copy, producing said final form of said representation whereon said contours of said areas of within predetermined portions of said topographic map directionally coinciding with said predetermined one and said other one of said diametrically opposing directions appear in shaded relief and highlighting, respectively, upon a background of contrasting intermediate shading.

5. The method of claim 1 wherein said initial form of said representation is a transparency copy containing within a substantially opaque background a conformation of transparent areas indicative of a topographic map having regularly indexed contour lines and other cartographic symbols, and wherein said light radiated from a plurality of spaced sources thereof and faced by said layered arrangement, is revolved about a point between at least two of said sources in a plane which is substantially parallel to surfaces characterizing the planar disposition of said contacting layers in their facing relationship to said lights, and said processing comprising, developing in a first of said layered arrangements a resultant exposure of light sensitive surface of said material by directing said radiated light thereon by way of said transparency copy and said spacer so as to produce thereby a harmonized negative transparency whereon the weight of all contour lines are equalized and wherefrom all said cartographic symbols are eliminated, developing in a second of said layered arrangements a further resultant exposure of a light sensitive surface of a further material by directing said radiated light thereon by way of said harmonized negative and said spacer so as to produce a first positive transparency whereon a first plurality of said equalized contour lines are enhanced to a degree where such lines which correspond to a first predetermined range of slope gradients become unified by a coalescence thereof, developing in a third and in sequence subsequent ones of said layered arrangements, further resultant exposures of light sensitive surfaces of further materials by directing said radiated light thereon by way of said harmonized negative and said spacer so as to produce second, and subsequently other positive transparencies whereon a second, and subsequently other further pluralities of said equalized contour lines are enhanced to a degree where such lines which correspond to a second, and subsequently other, predetermined ranges of slope gradients become unified by their coalescence, producing by contact printing, employing said first positive transparency, and subsequently said second positive transparency and in sequence said other positive transparencies as copy, a first and second and subsequently other negative transparencies having thereon transparent reversals of said respective coalesced contours, developing in a fourth of said layered arrangements a still further resultant exposure of a light sensitive surface of a still further material by directing said radiated light thereon by way of said first positive transparency and said spacer so as to produce a first negative transparency whereon by diminution of said coalesced contours the edges defining transparent areas thereof are coextensive with the true edges of said coalescence, developing in a fifth, and in sequence subsequent ones of said layered arrangements, yet still further resultant exposures of light sensitive surfaces of further materials by directing said radiated light thereon by way of said second and said other positive transparencies and said spacer so as to produce a second and subsequently other negative transparencies whereon by diminution of said coalesced contours the edges defining transparent areas thereof are coextensive with the true edges of said coalescence, producing by contact printing employing said first negative transparency, and subsequently said second negative transparency and in sequence said other true-edged transparencies as copy, a first, second and subsequently other positive transparencies having thereon opaque reversals of said true-edged transparent areas, applying said first, second and other positive transparencies having opaque reversals of said true-edged transparent areas as masks on, respectively, said first, second and other negative transparencies having thereon transparent reversals of said respective coalesced contours, to produce an arrangement of composite transparencies whereon only said first, second and other respective coalesced areas appear as transparent areas, and correspond respectively to a descending order of slope gradient zones of said topographic map.

6. The method of claim 5 wherein the respective ones of said composite transparencies are screened with a separate one of a corresponding number of differently colored transparencies, and by contact printing each of the screened composite transparencies on a singular color sensitive film producing a map whereon said slope gradient zones are distinguishable by their respective colorations.

7. The method of claim 1 wherein said initial form of representation is a first positive transparency copy containing within a substantially transparent background a conformation of opaque areas indicative of symbols on a topographic map, said symbols having sizes falling within a predetermined range of sizes, and wherein said light radiated from a plurality of spaced sources thereof and faced by said layered arrangement, is revolved about a point between at least two of said sources in a plane which is substantially parallel to surfaces characterizing the planar disposition of said contacting layers in their facing relationship to said lights, and said processing comprising, developing in a first of said layered arrangements a resultant exposure of light sensitive surface of said material by directing said radiated light thereon by way of said first positive transparency copy and said spacer so as to produce thereby a first negative transparency whereon the sizes of all symbols fall within a first range of sizes less than said predetermined range, developing in a second of said layered arrangements a further resultant exposure of a light sensitive surface of a further material by directing said radiated light thereon by way of said first negative transparency and said spacer so as to produce thereto a first positive transparency whereon all symbols in said first ranges of sizes are increased in size beyond a predetermined designated size, producing by contact printing employing said first positive transparency as copy, a second negative transparency having thereon transparent reversals of said symbols of increased size, producing by contact printing employing said transparency copy as copy, a reversal transparency of said first positive transparency copy, and applying said second negative transparency as a mask upon said reversal transparency of said first positive transparency copy, and contact printing the resultant composite to produce a third positive transparency whereon all symbols appearing are no less than said predermined designated size.

* * * * *

UNITED STATES PATENT OFFICE
CERTIFICATE OF CORRECTION

Patent No. 3,743,415          Dated July 3, 1973

Inventor(s)   Clarence R. Gilman

Figure 8J:
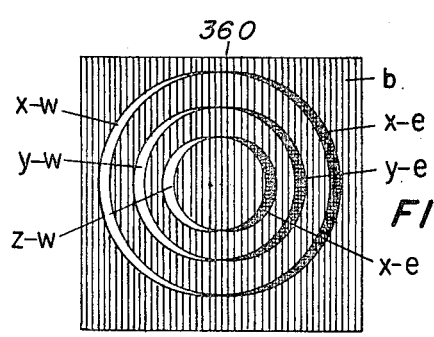

It is certified that error appears in the above-identified patent and that said Letters Patent are hereby corrected as shown below:

In Fig. 8J, change the lower reference numeral "x-e" to read -- z-e --; In Fig. 10, in the bottom row of rectangles, rectangle 18, delete "AS MASK AND": In Fig. 10, in the bottom row of rectangles, rectangle 19, change "AND" to -- BY SEPARATELY --.

Signed and sealed this 26th day of March 1974.

(SEAL)
Attest:

EDWARD M. FLETCHER, JR.                C. MARSHALL DANN
Attesting Officer                      Commissioner of Patents